US008978097B2

(12) United States Patent
Yu

(10) Patent No.: US 8,978,097 B2
(45) Date of Patent: Mar. 10, 2015

(54) METHOD AND SYSTEM FOR AUTHENTICATION BASED ON WIRELESS IDENTIFICATION, WIRELESS IDENTIFICATION AND SERVER

(75) Inventor: Chentao Yu, Beijing (CN)

(73) Assignees: Legend Holdings Ltd., Beijing (CN); Lenovo (Beijing) Limited, Beijing (CN)

( * ) Notice: Subject to any disclaimer, the term of this patent is extended or adjusted under 35 U.S.C. 154(b) by 1584 days.

(21) Appl. No.: 12/057,908

(22) Filed: Mar. 28, 2008

(65) Prior Publication Data

US 2008/0244271 A1 Oct. 2, 2008

(30) Foreign Application Priority Data

Mar. 28, 2007 (CN) .......................... 2007 1 0064902

(51) Int. Cl.
*H04L 9/00* (2006.01)
*H04L 9/32* (2006.01)
*H04W 12/06* (2009.01)
*H04L 29/06* (2006.01)

(52) U.S. Cl.
CPC ............. *H04L 9/3247* (2013.01); *H04W 12/06* (2013.01); *H04L 63/0492* (2013.01); *H04L 2209/60* (2013.01); *H04L 2209/805* (2013.01)
USPC ............................................. 726/2; 455/3.01

(58) Field of Classification Search
USPC ............. 726/1–6; 455/3.01, 403, 39; 713/176
See application file for complete search history.

(56) References Cited

U.S. PATENT DOCUMENTS

| | | | | |
|---|---|---|---|---|
| 6,717,516 | B2 | 4/2004 | Bridgelall | |
| 6,998,987 | B2 | 2/2006 | Lin | |
| 7,176,800 | B2 * | 2/2007 | Sajkowsky | 340/572.1 |
| 7,532,122 | B2 * | 5/2009 | Aull et al. | 340/572.4 |
| 2006/0163349 | A1 * | 7/2006 | Neugebauer | 235/383 |
| 2010/0040232 | A1 * | 2/2010 | Hamberg | 380/270 |

* cited by examiner

*Primary Examiner* — Kambiz Zand
*Assistant Examiner* — Leynna Truvan

(57) ABSTRACT

The invention discloses a method and a system for authentication based on a wireless identification, and a wireless identification. The method comprises steps of: obtaining, by a mobile device, wireless tag information and connection configuration information from the wireless identification; establishing, by the mobile device, a connection with the server according to the connection configuration information, and transmitting, by the mobile device, the wireless tag information to the server; authenticating, by the server, the validity of the wireless tag information, and determining, by the server, an access right of the mobile device after the authentication is successful; generating, by the wireless identification, device signature information and forwarding it, by the mobile device, to the server; and authenticating, by the server, the validity of the device signature information, and canceling, by the server, the access right of the mobile device. The present invention provides an authentication system based on the wireless identification, wherein the server authenticates not only the wireless tag information, but also the device signature information generated by the wireless identification, thereby the system is of a higher security.

26 Claims, 5 Drawing Sheets

METHOD AND SYSTEM FOR AUTHENTICATION BASED ON WIRELESS IDENTIFICATION, WIRELESS IDENTIFICATION AND SERVER

BACKGROUND OF THE INVENTION

1. Field of Invention

The present invention relates to a wireless authentication technique, particularly to an authentication method and an authentication system based on a wireless identification, a wireless identification and a server.

2. Description of Prior Art

With the development of telecommunication and positioning techniques, a positioning application based on a wireless network technique has rapidly become widespread. More and more mobile devices have positioning functions. The operators also provide services based on a user position ceaselessly, such as a car navigation, a personal position tracking, and an information pushing service based on a position, etc.

A positioning application based on a Global Positioning System (GPS) and a wireless communication network has been widely applied. The GPS technique is capable of achieving a higher positioning precision. However, the GPS technique may not work due to a signal blind in a building.

Currently, there are some wireless positioning techniques based on a Wireless Local Area Network (WLAN) or a Second Generation (2G) Network, a Third Generation (3G) Network. These techniques generally use a three-point positioning technique to calculate a current position of a user. However, these schemes may only estimate a rough position of the user, and hardly achieve a higher positioning precision.

With the rapid decreasing of costs on an wireless identification such as a Wireless Frequency Identification (RFID) tag etc, articles, publications and intelligent devices containing wireless identifications are more and more popular. The range of the positioning application based on the wireless identification technique is becoming much wider. For example, U.S. Pat. No. 6,717,516 "Hybrid bluetooth/RFID based real time location tracking" provides a method and a system for positioning an article by using a RFID/BT identification. U.S. Pat. No. 6,998,987 "Integrated RFID and video tracking system" discloses a method and a system for enhancing video content services based on position information on a RFID identification of a device.

These inventions enable a precise user positioning by using additional position information on RFID. In the prior art, however, identification information stored by the wireless identification and corresponding position information are mainly used. The authentication based on a wireless identification is relatively easier, which causes the security of the application is lower.

SUMMARY OF THE INVENTION

Accordingly, a technical problem to be solved by the present invention is to provide an authentication method based on a wireless identification. The method is of higher security.

The method according to the present invention comprises steps of:

A. obtaining, by a mobile device, wireless tag information and connection configuration information from a wireless identification via a short-range wireless connection;

B. establishing, by the mobile device, a high-speed wireless connection with a server according to the connection configuration information, and transmitting, by the mobile device, the wireless tag information to the server via the high-speed wireless connection;

C. authenticating, by the server, the validity of the wireless tag information, and determining, by the server, an access right of the mobile device after the authentication is successful;

D. generating, by the wireless identification, device signature information and transmitting it to the mobile device via the short-range wireless connection; and forwarding it, by the mobile device, to the server via the high-speed wireless connection after receiving the device signature information; and E. authenticating, by the server, the validity of the device signature information, and allowing, by the server, the mobile device to access contents on the server if the authentication is successful; otherwise, canceling, by the server, the access right of the mobile device.

Wherein, the device signature information may be generated by the wireless identification periodically. The device signature information contains a wireless identification device description, timestamp information and a service type.

Further, the device signature information contains a message signature and time-varying information. The message signature is digest information generated by a digest generation algorithm. The time-varying information is generated by a random number generator or in a fixed increment manner.

The short-range wireless connection may be a connection based on RFID, Bluetooth, Infrared, or a new wireless network data communication technique-Zigbee. The high-speed wireless connection may be a connection based on a Wireless Fidelity (WiFi), WIMAX, 3G, GPRS or CDMA.

Further, the wireless identification and the server share the same encryption algorithm and the same encryption key; the wireless tag information and the device signature information are forwarded by the mobile device from a wireless node identification to the server in an encryption manner.

Further, the method comprises a step between the steps C and D of:

ii. the server and the wireless identification negotiating the encryption manner by means of the mobile device according to a content security level.

Further, the step ii comprises steps of:

determining, by the server, encryption manner information according to the content security level, and transmitting the encryption manner information to the mobile device through wireless authentication message;

forwarding, by the mobile device, the wireless authentication message to the wireless identification; and setting, by the wireless identification, the encryption manner according to the received wireless authentication message.

Wherein, the encryption manner information contains an encryption algorithm, an encryption key and a duration of validity.

Further, the mobile device obtains a service from a content server by using the wireless authentication message after it gets the wireless authentication message.

According to the authentication method based on the wireless identification of the present invention, the wireless identification not only stores wireless tag information, but also generates the device signature information. The server authenticates the wireless tag information, and also authenticates the device signature information generated by the wireless identification during the mobile device receiving the content service. The mobile device may continue to receive the content service only if it has to be located in a coverage range of the wireless identification to forward the device signature information. If the mobile device leaves the coverage range of the wireless identification, it can not obtain the device signature information. Thus, the server will cancel the access right of the mobile device, thereby the security of the authentication method is improved.

Another technical problem to be solved by the present invention is to provide an authentication system based on a wireless identification. The authentication system is of higher security.

The authentication system of the present invention comprises a wireless identification, a mobile device and a server, wherein the wireless identification is configured for storing wireless tag information and connection configuration information, and generating device signature information;

the mobile device is used for obtaining the wireless tag information and the connection configuration information stored by a wireless identification via a short-range wireless interface; establishing a high-speed wireless connection with a server according to the connection configuration information, and transmitting the wireless tag information to the server; obtaining the device signature information from the wireless identification and transmitting it to the server;

the server is used for receiving the wireless tag information transmitted by the mobile device, authenticating the validity of the wireless tag information, and determining an access right of the mobile device after the authentication is successful; receiving the device signature information transmitted by the mobile device, authenticating the validity of the device signature information, and canceling the access right of the mobile device when the authentication is failed.

Wherein, the device signature information is generated by the wireless identification periodically. The server keeps an off-line synchronization with the wireless identification.

Further, the device signature information contains a message signature and time-varying information. The message signature is digest information generated by a digest generation algorithm. The time-varying information is generated by a random number generator or in a fixed increment manner.

The short-range wireless connection may be a connection based on RFID, Bluetooth, Infrared, or a new wireless network data communication technique-Zigbee. The high-speed wireless connection may be a connection based on a Wireless Fidelity (WiFi), WIMAX, 3G, GPRS or CDMA.

Further, the server provides the mobile device with a content service after the validity of authenticating the wireless tag information is successful.

Further, the server updates the access right of the mobile device according to the validity of the device signature information.

Further, the authentication system comprises a content server for providing the mobile device with the content service.

The server transmits access authorization information to the mobile device after the authentication of the wireless tag information is successful. The mobile device obtains the content service according to the access authorization information.

According to the authentication system based on the wireless identification of the present invention, the wireless identification stores wireless tag information, and generates the device signature information. The server not only authenticates the wireless tag information, but also authenticates the device signature information generated by the wireless identification. The device signature information may be generated by the wireless identification periodically or randomly, thereby enable the authentication system to have a higher security.

According the authentication system based on the wireless identification of the present invention, the wireless identification is connected to the mobile device via a short-range wireless link. After the mobile device leaves a working range of the wireless identification, a link layer connection between the wireless identification and the mobile device is disconnected. The mobile device stops to receive the device signature information transmitted by the wireless identification, and simultaneously can not transmit valid device signature information to the server via the high-speed wireless link. After a time-out period to reach the server, the server will stop to update the access authorization information and the content service to the mobile device.

Another technical problem to be solved by the present invention is to provide a wireless identification with a function of generating signature information.

The wireless identification of the present invention is used for storing wireless tag information and connection configuration information and generating device signature information.

The wireless identification of the present invention comprises a information storage module, a signature information generation module and a short-range communication module.

The information storage module is used for storing wireless tag information and connection configuration information.

The signature information generation module is used for generating device signature information.

The short-range communication module is used for providing the wireless tag information, the connection configuration information and the device signature information via a short-range communication protocol.

Further, the wireless identification of the present invention comprises an encryption negotiation module for receiving encryption manner information. The signature information generation module encrypts the device signature information according to the encryption manner information.

Another technical problem to be solved by the present invention is to provide a server with a function of authenticating device signature information.

The server of the present invention comprises:

a high-speed wireless communication module for communicating with a wireless device via a high-speed wireless connection;

a wireless tag information authentication module for receiving the wireless tag information through the high-speed wireless communication module, authenticating the validity of the wireless tag information, and determining an access right of the wireless device after the authentication is successful; and a device signature information authentication module for receiving the device signature information through the high-speed wireless communication module, authenticating the validity of the device signature information, and canceling the access right of the wireless device after the authentication is failed.

Further, the wireless tag information authentication module is used for determining encryption manner information after the access right of the wireless device is determined; and transmitting the encryption manner information to the wireless device through the high-speed wireless communication module. Wherein, the encryption manner information contains an encryption algorithm, an encryption key, and information on a duration of validity.

Further, the server comprises a content providing module for providing content service to the wireless device.

The wireless tag information authentication module informs the content providing module of providing the wireless device with services after the access right of the wireless device is determined.

Further, the device signature information authentication module informs the content providing module of stopping to provide the wireless device with services after the authentication of the device signature information is failed.

DETAILED DESCRIPTION OF PREFERRED EMBODIMENTS

Figure 1:
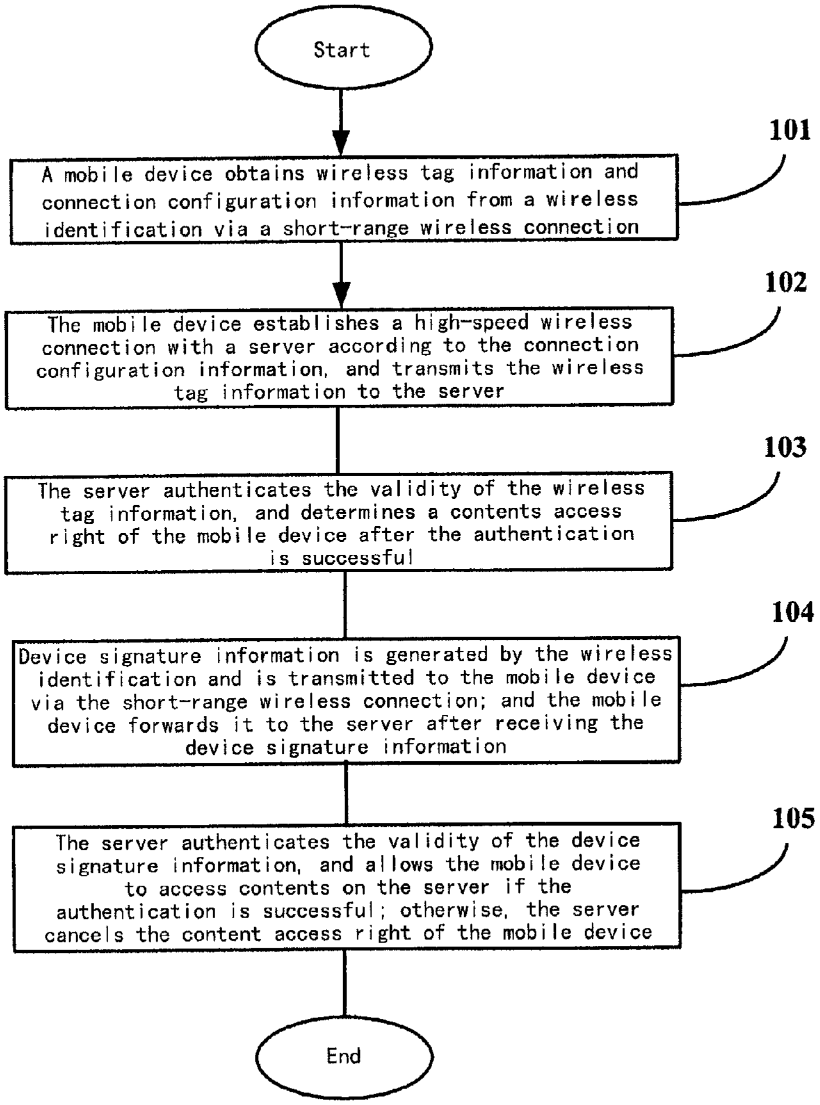
FIG. 1 is a flowchart of an authentication method based on a wireless identification according to the present invention.

The principal idea of the present invention is that a wireless identification is disposed in a fixed position area, and connects to a mobile device in a short-range wireless way. The mobile device finds the wireless identification in the short-range wireless way, and obtains wireless tag information and connection configuration information from the wireless identification. The mobile device establishes a connection with a server according to the connection configuration information. Then the server authenticates the validity of a device identification transmitted by the mobile device, and provides an access right or a content service after the authentication is successful. During the provision of the service, the server authenticates the validity of device signature information generated from the wireless identification forwarded by the mobile device, and cancels the access right of the mobile device or the service provision when the authentication is failed.

Hereinafter, the present invention will be further described in detail by referring to the drawings and the embodiments in order to make the objects, technical scheme and advantages of the present invention more apparent.

Hereinafter, a preferable embodiment of the present invention is illustrated with reference to FIG. 1.

As referred to FIG. 1, a flowchart of an authentication method based on a wireless identification according to the present invention is shown which comprises the steps as follows:

In step 101, wireless tag information and connection configuration information are stored in a wireless identification, and the mobile device obtains the wireless tag information and the connection configuration information from the wireless identification via a short-range wireless connection.

The wireless identification may be a RFID (radio frequency identification) tag. The mobile device has a short-range wireless interface, and may initiatively read the wireless tag information and the connection configuration information from the wireless identification or receive the wireless tag information and the connection configuration information transmitted initiatively by the wireless identification. A short-range connection between the mobile device and the wireless identification may be based on RFID, Bluetooth, a new wireless network data communication technique (Zigbee) etc.

In step 102, the mobile device establishes a high-speed wireless connection with a server according to the obtained connection configuration information. After the establishment of the connection, the mobile device forwards the wireless tag information to the server via the high-speed wireless connection.

The high-speed wireless connection with the server established by the mobile device may be based on a Wireless Fidelity (WiFi), WIMAX (Worldwide Interoperability for Microwave Access), 3G (3rd Generation), GPRS (General Packet Radio Service) or CDMA (Code Division Multiple Access) etc.

In step 103, the server authenticates the received wireless tag information; if the authentication result is that the wireless tag information is valid, an access right of the mobile device is determined.

After the access right of the mobile device is determined, the server may provide the mobile device with a service according to the access right of the mobile device, and may also transmit access right information to the mobile device. The mobile device obtains a content service as needed from other content servers according to the access right information.

After the server authenticates the wireless tag information successfully, the server may transmit security negotiation information to the wireless identification by the mobile device. This security negotiation information is used for synchronization wireless identification and a security-related set of the server, such as an encryption algorithm, an encryption key, a generation rule of time-varying information in the device signature information. For example, the security negotiation information may contain one or more of random number generator seeds, an encryption key of device signature information, a signature key and a device signature information timing interval. The security negotiation information may be encrypted and signed by a predetermined key. The mobile device transmits the security negotiation information via the short-range wireless connection, after it receives the security negotiation information transmitted via the high-speed wireless connection. The wireless identification authenticates the security negotiation information with the predetermined key, and initializes a device signature information generation algorithm.

In step 104, the wireless identification generates the device signature information, and transmits it to the mobile device via the short-range wireless connection. The mobile device receives the device signature information, and forwards it to the server via the high-speed wireless connection. The device signature information may contain one or more of the following information: a message type, a wireless identification device description, a simple value, a timestamp, a device signature and a service type etc.

The wireless identification may generate the device signature information in a predetermined timing way or randomly. When the wireless identification generates the device signature information, a message signature and time-varying information may be contained in the device signature information in order to prevent an illegal modification or playback by the mobile device. The message signature may be digest information generated by a digest generation algorithm, wherein, the digest generation algorithm may be SHA-1, HMAC, MD4, MD5, etc. The time-varying information may be a nonce varied with a certain rule, and this nonce may be generated by a random number generator or in a fixed increment way.

In step 105, the server authenticates the validity of the device signature information. If the authentication is successful, the mobile device is allowed to access contents in the server; otherwise, the access right of the mobile device is cancelled. The server keeps an off-line synchronization with the wireless identification generation device signature information, thereby the validity of the received device signature information may be authenticated. The manner in which the synchronization is kept comprises a generation manner in which the server and the wireless identification pre-set the device signature information, or a generation manner in which the device signature information is determined by a message negotiation.

To enhance the security of authentication, the wireless tag information and the device signature information may be encrypted. One of the encryption approaches is to employ a symmetric encryption algorithm (such as DES, 3DES, AES etc.) and the wireless identification and the server pre-share the same key and the encryption algorithm. An asymmetric encryption algorithm may also be used, such as ECC, RAS etc. Then, a public key is stored in the wireless identification and a private key is stored in the server. When the mobile device obtains the encrypted wireless tag information or the encrypted device signature information, the information is directly forwarded to the server via the high-speed wireless connection without any modification. The server decrypts it based on a corresponding encryption algorithm and key.

After the server has authenticated the wireless tag information, it may negotiate the encryption manner with the wireless identification. The negotiation process is that firstly the server determines the encryption manner according to content security levels, and the encryption manner information is sent to the mobile device via wireless authentication message; the mobile device forwards the wireless authentication message to the wireless identification; the wireless identification sets the encryption manner according to the received wireless identification message, and the generated device signature information is encrypted via a new encryption manner. The approach manner may comprise information such as the encryption algorithm, the encryption key and the duration of validity, etc.

According to the authentication method based on the wireless identification of the present invention, the wireless identification not only stores the wireless tag information, but also generates the device signature information. The server authenticates the wireless tag information, and authenticates the device signature information generated by the wireless identification during the mobile device receives the content service. The mobile device may continue to receive the content service only if it is located in a coverage range of the wireless identification to forward the device signature information. If the mobile device leaves the coverage range of the wireless identification, a link layer between the mobile device and the wireless identification is disconnected, then the mobile device can not obtain a valid device signature information. If the server does not obtain the device signature information after a period of time, it will cancel the access right of the mobile device in order to prevent a mobile device out of the coverage range from receiving the content service. Therefore, the security of the authentication method is improved.

Figure 2:
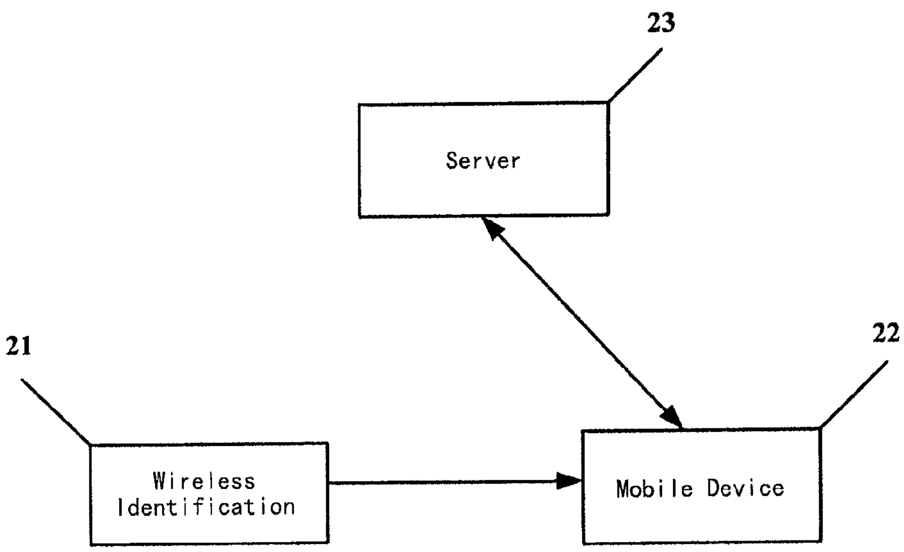
FIG. 2 is a structure schematic view of one embodiment of an authentication system based on a wireless identification according to the present invention.

An authentication system based on a wireless identification is also provided in the present invention. Referring to FIG. 2, the authentication system comprises a wireless identification 21, a mobile device 22 and a server 23.

The wireless identification is configured for storing wireless tag information and connection configuration information, and generating device signature information. The wireless identification may initiatively transmit the wireless tag information, the connection configuration information and the device signature information, and may also passively receive device readings.

The mobile device is used for obtaining the wireless tag information and the connection configuration information stored by a wireless identification via a short-range wireless interface; establishing a high-speed wireless connection with a server according to the connection configuration information, and transmitting the wireless tag information to the server; obtaining the device signature information from the wireless identification and transmitting it to the server.

The mobile device has a short-range wireless interface and a high-speed wireless interface. The mobile device communicates with the wireless identification through the short-range wireless connection interface and over a short-range wireless communication protocol, and communicates with the server through the high-speed wireless connection interface and over a high-speed wireless communication protocol. The short-range wireless communication protocol may be RFID, Bluetooth, and Zigbee etc. The high-speed wireless communication protocol may be WIFI, WIMAX, 3G, GPRS or CDMA etc. The wireless tag information and the device signature information may be transmitted between the wireless identification and the mobile device, and between the mobile device and the server in an encrypted way.

The server is used for receiving the wireless tag information transmitted by the mobile device, authenticating the validity of the wireless tag information, and determining an access right of the mobile device after the authentication is successful; receiving the device signature information transmitted by the mobile device, authenticating the validity of the device signature information, and canceling the access right of the mobile device when the authentication is failed.

According to one approach for providing the mobile device with the content service, the server provides the content service to the mobile device after the validity of the wireless tag information is authenticated by the server. According to another approach, the server transmits access authorization information to the mobile device after the validity of the wireless tag information is authenticated by the server, and the mobile device obtains the content service from a content server according to the access authorization information.

According to the authentication system based on the wireless identification of the present invention, the wireless identification stores wireless tag information, and generates the device signature information. The server not only authenticates the wireless tag information, but also authenticates the device signature information generated by the wireless identification. The device signature information may be generated by the wireless identification periodically or randomly, thereby enable the authentication system to have a higher security.

A wireless identification applied in the authentication method and the authentication system is provided in the present invention. The wireless identification of the present invention is used for storing wireless tag information and connection configuration information and generating device signature information.

Figure 3:
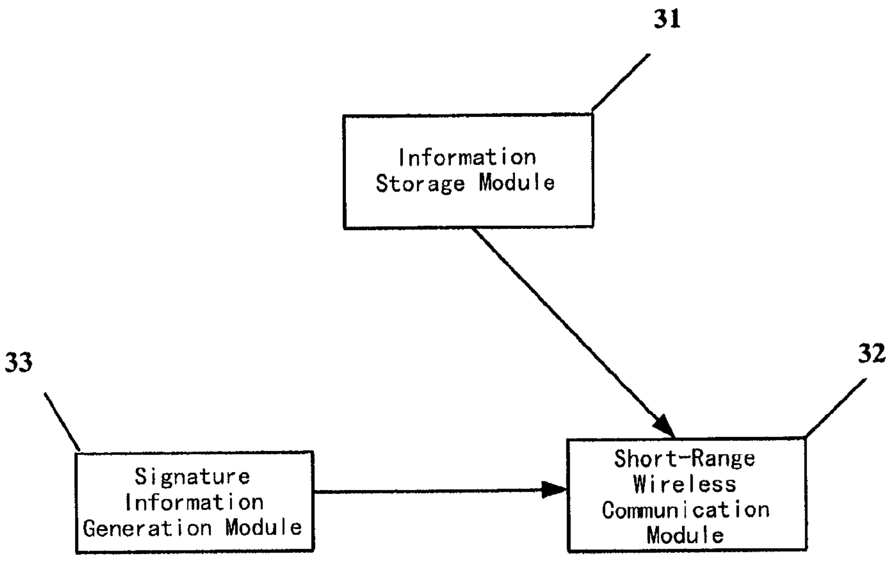
FIG. 3 is a structure schematic view of one embodiment of a wireless identification according to the present invention.

Referring to FIG. 3, a structure schematic view of one embodiment of the wireless identification according to the present invention is illustrated, which comprises a information storage module 31, a short-range communication module 32 and a signature information generation module 33.

The information storage module is used for storing wireless tag information and connection configuration information.

The signature information generation module is used for generating device signature information.

The short-range communication module is used for providing the wireless tag information, the connection configuration information and the device signature information via a short-range communication protocol.

Further, the wireless identification of the present invention comprises an encryption negotiation module for receiving encryption manner information. The signature information generation module encrypts the device signature information according to the encryption manner information.

Figure 4:
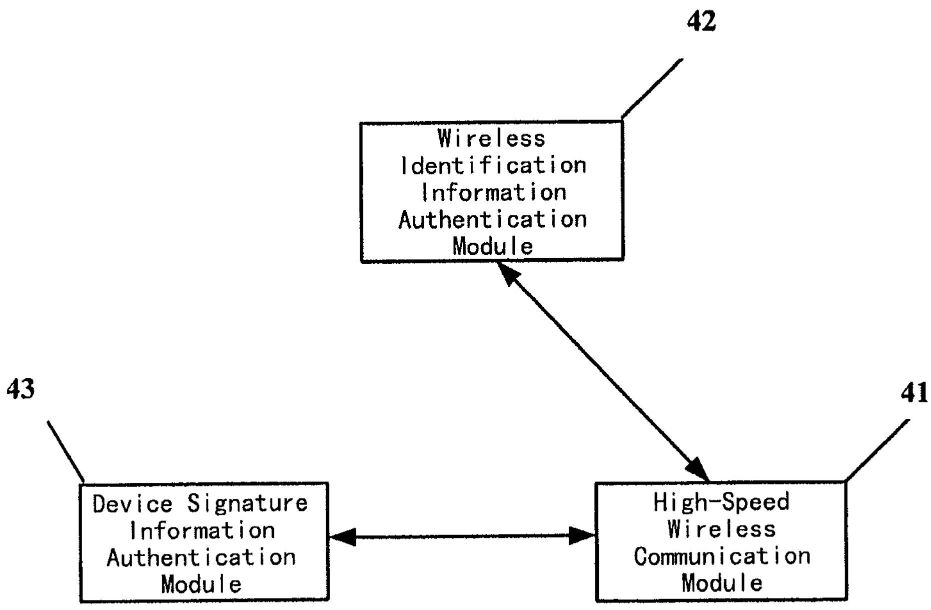
FIG. 4 is a structure schematic view of a server according to the present invention.

A server is provided in the present invention. FIG. 4 is a structure schematic view of the server according to the present invention, which comprises a high-speed wireless communication module 41, a wireless tag information authentication module 42 and a device signature information authentication module 43.

The high-speed wireless communication module is used for communicating with a wireless device via a high-speed wireless connection.

The wireless tag information authentication module for receiving the wireless tag information through the high-speed wireless communication module, authenticating the validity of the wireless tag information, and determining an access right of the wireless device after the authentication is successful.

The device signature information authentication module for receiving the device signature information through the high-speed wireless communication module, authenticating the validity of the device signature information, and canceling the access right of the wireless device after the authentication is failed.

The wireless tag information authentication module is further used for determining encryption manner information after the access right of the wireless device is determined; and transmitting the encryption manner information to the wireless device through the high-speed wireless communication module. Wherein, the encryption manner information contains an encryption algorithm, an encryption key, and information on a duration of validity.

Further, the server comprises a content providing module for providing content service to the wireless device. The wireless tag information authentication module informs the content providing module of providing the wireless device with services after the access right of the wireless device is determined. The device signature information authentication module informs the content providing module of stopping to provide the wireless device with services after the authentication of the device signature information is failed.

Hereinafter, two embodiments according to the method and system of the present invention will be described in detail.

Figure 5:
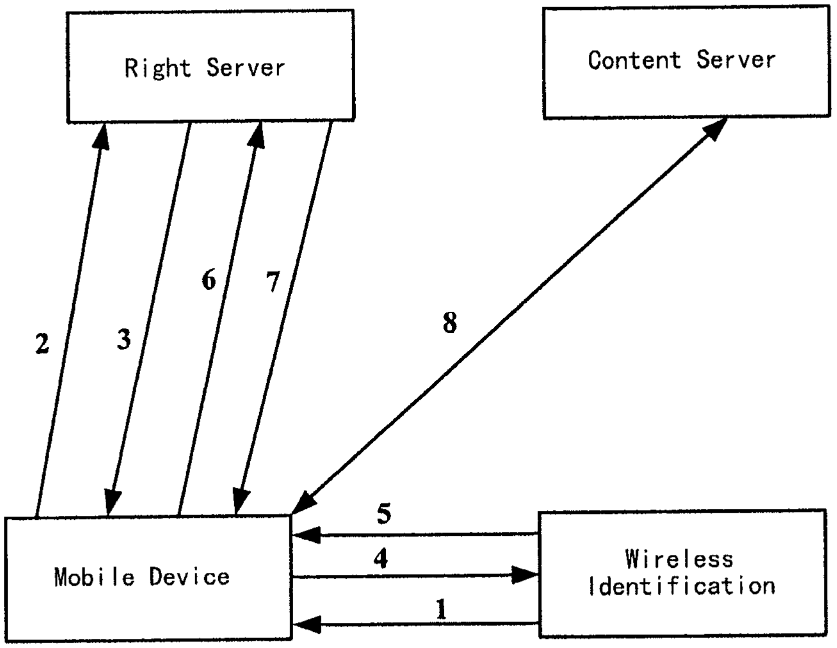
FIG. 5 is a flow schematic view of an exemplary system according to the present invention.

A first embodiment is a digital content distribution. In this embodiment, a wireless identification is installed in a certain fixed area by a service provider. The wireless identification stores addresses of a right server and a media server of digital contents. The mobile device establishes a connection with the right server through information returned by the wireless identification. The right server authenticates the validity of the wireless identification. After the authentication is successful, the mobile device obtains a media access right from the right server, and obtains an access manner description of the media server according to a right description file. The mobile device may access authorized media content within the area disposed with the wireless identification. When the mobile device leaves the area, its media access right is invalid automatically. FIG. 5 shows a flow schematic view of the system according to this embodiment, comprising the steps of:

In step 5.1, the mobile device reads wireless tag information and high-speed connection configuration information of the wireless identification from the wireless identification. The wireless tag information may be transmitted after it is encrypted and signed with a key shared by the wireless identification and the right server. The high-speed connection configuration information comprises addresses of the right server and the media server, and is transmitted from the wireless identification to the mobile device in a plaintext way.

In step 5.2, the mobile device establishes a high-speed wireless connection with the right server by using the high-speed connection configuration information in the wireless identification. The mobile device transmits a mobile device identification and the wireless tag information of the wireless identification to the right server.

In step 5.3, the right server authenticates the validity of the wireless tag information of the wireless identification, and records the mobile device identification. If the wireless tag information is valid, the right server transmits wireless authentication information back to the mobile device in an encrypted way. This information contains information such as an encryption algorithm, an encryption key, a duration of validity for transmission, a mobile device identification and an encryption key identification, etc.

In step 5.4, the mobile device forwards the wireless authentication information to the wireless identification. The wireless identification sets a communication manner with the right server according to this information.

In step 5.5, the wireless identification transmits the device signature information to the mobile device periodically. The signature information may use a key shared by the wireless identification and the right server to perform the encryption and signature. The device signature information is used for keep the validity of data connection.

In step 5.6, the mobile device transmits the device signature information and the mobile device identification to the right server.

In step 5.7, the right server authenticates the validity of the device signature information and the mobile device identification, and feeds the updated access right back to the mobile device.

In step 5.8, the mobile device accesses a media server via the feedback access information, and obtains the accessed media data.

Figure 6:
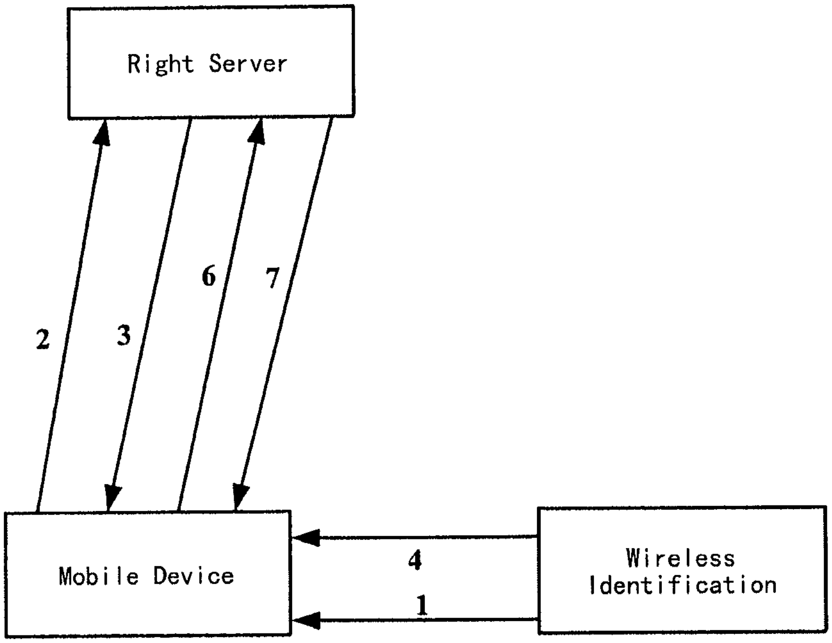
FIG. 6 is a flow schematic view of another exemplary system according to the present invention.

A second embodiment of the present invention relates to a broadcast content authority access. In this embodiment, a wireless identification and a server pre-determined an encryption method, and the wireless identification and a right server keep the synchronization of a transition process for the encryption method. After the right server completes the authentication of the wireless identification, the mobile device obtains wireless identification device signature information from the wireless identification periodically, and forwards the information to the right server. The right server maintains a digital broadcast to the mobile device with this information. This application is especially adapted for a low-cost identification and a scenario in which a plurality of mobile devices are served. FIG. 6 illustrates a flow schematic view of this exemplary system, which comprises the steps of:

In step 6.1, the mobile device reads wireless tag information and high-speed connection configuration information in a wireless identification. The wireless tag information of the wireless identification may perform encryption and signature with a key shared by the wireless identification and the right server. The high-speed connection configuration may be delivered from the wireless identification to the mobile device in a plaintext way.

In step 6.2, the mobile device establishes a high-speed wireless connection with the right server by using the high-speed connection configuration information in the wireless identification. The mobile device transmits its device identification and the wireless tag information of the wireless identification to the right server.

In step 6.3, the right server authenticates the validity of the wireless tag information in the wireless identification, and stores the mobile device identification.

In step 6.4, the wireless identification transmits device signature information to the mobile device periodically. This signature information may use the key shared by the wireless identification and the right server to perform the encryption and signature. The device signature information is used for maintaining the validity of the data connection.

In step 6.6, the mobile device transmits the device signature information and the mobile device identification to the right server.

In step 6.7, the right server authenticates the validity of the device signature information and the mobile device identification, and feeds the updated access right back to the mobile device.

According to an authentication system based on a wireless identification and a method thereof, the wireless identification stores wireless tag information and generates device signature information. The server authenticates the wireless tag information, and authenticates the device signature information during the mobile device receives content services. The mobile device may continue to receive the content services only if it is located in a coverage range of the wireless identification to forward the device signature information. If the mobile device can not receive the device signature information because of leaving out of the coverage range of the wireless identification, the server cancels an access right of the mobile device, in order to prevent the mobile device out of the coverage range from receiving the content services. Therefore, the security of the authentication system and the method thereof is improved. The wireless tag information and the device signature information are encrypted and transmitted, in order to prevent them from being tampered or used spitefully during transmission, thereby the security of authentication is improved. The server may negotiate the encryption manner with the wireless identification to improve the flexibility and security of the authentication method according to the present invention. The separation of the right server and the content server may better manage problems such as traffic and access rights, so as to improve the efficiency of the whole system.

The wireless identification may be located in a certain site such as indoors. According to the method and the system of the present invention, a media content service may be provided automatically according to a position of a user. When the user leaves the site, the media content service is invalid automatically, which is of better utility.

The above is only the preferred embodiments of the present invention and the present invention is not limited to the above embodiments. Therefore, any modifications, substitutions and improvements to the present invention are possible without departing from the spirit and scope of the present invention.

What is claimed is:

1. An authentication method based on a wireless tag device, comprising steps of:

A. obtaining, by a mobile device, wireless tag information and connection configuration information both generated by the wireless tag device disposed in a fixed position via a short-range wireless communication;

B. establishing, by the mobile device, a high-speed wireless communication with a server according to the obtained connection configuration information, and forwarding the obtained wireless tag information to the server via the high-speed wireless communication;

C. authenticating, by the server, the validity of the wireless tag information forwarded from the mobile device, and determining an access right of the mobile device after the authentication is successful and providing the content service to the mobile device;

D. periodically generating, by the wireless tag device, device signature information and transmitting the device signature information via the short-range wireless communication;

E. receiving, by the mobile device located within the wireless communication area covered by the wireless tag device, the periodically generated device signature information and forwarding the received device signature information to the server via the high-speed wireless communication so that the server may determine the mobile device is still within the wireless communication area covered by the wireless tag device based on the device signature information forwarded from the mobile device and continuously provide content service to the mobile device; and F. cancelling, by the server, the access right of the mobile device if the server does not receive the device signature information for a predetermined interval.

2. The authentication method according to claim 1, wherein the device signature information containing a wireless tag device description, timestamp information and service type information.

3. The authentication method according to claim 2, wherein the device signature information contains a message signature and time-varying information.

4. The authentication method according to claim 3, wherein the message signature is digest information generated by using a digest generation algorithm.

5. The authentication method according to claim 3, wherein the time-varying information is generated by a random number generator or in a fixed increment manner.

6. The authentication method according to claim 1, wherein the short-range wireless communication is based on RFID, Bluetooth, Infrared, or a new wireless network data communication technique-Zigbee.

7. The authentication method according to claim 1, wherein the high-speed wireless communication is based on Wireless Fidelity WiFi, WIMAX, 3G, GPRS or CDMA.

8. The authentication method according to claim 1, wherein the wireless tag device and the server share the same encryption algorithm and the same encryption key; the wireless tag information and the device signature information are forwarded by the mobile device from a wireless node identification to the server in an encryption manner.

9. The authentication method according to claim 8, further comprising a step between the steps C and D of:

ii. negotiating, by the server and the wireless tag device, the encryption manner by means of the mobile device according to a content security level.

10. The authentication method according to claim 9, wherein the step ii comprises steps of:

determining, by the server, encryption manner information according to the content security level, and transmitting the encryption manner information to the mobile device through wireless authentication message;

forwarding, by the mobile device, the wireless authentication message to the wireless tag device; and setting, by the wireless tag device, the encryption manner according to the received wireless authentication message.

11. The authentication method according to claim 10, wherein the encryption manner information contains an encryption algorithm, an encryption key and a duration of validity.

12. The authentication method according to claim 10, wherein the mobile device obtains a service from a content server by using the wireless authentication message after it obtains the wireless authentication message.

13. A server used in an authentication system based on a wireless tag device for executing the authentication method of claim 1, comprising a processor configured to receive the wireless tag information forwarded by a mobile device located within the wireless communication area covered by the wireless tag device through high-speed wireless communication, authenticate the validity of the wireless tag information, determine an access right of the mobile device after the authentication is successful and provide content service to the mobile device;

receive device signature information forwarded from the mobile device and determine the mobile device is still within the wireless communication area covered by the wireless tag device based on the device signature information and continuously provide content service to the mobile device; and cancel the access right of the mobile device if device signature information is not received for a predetermined interval.

14. The server according to claim 13, wherein the processor is further configured to determine encryption manner information after the access right of the mobile device is determined; and transmit the encryption manner information to the mobile device through the high-speed wireless communication.

15. The server according to claim 14, wherein the encryption manner information contains an encryption algorithm, an encryption key, and information on a duration of validity.

16. A mobile device in an authentication system based on a wireless tag device for executing the authentication method of claim 1, comprising a processor configured to obtain wireless tag information and connection configuration information generated by a wireless tag device via a short-range wireless interface;

forward the wireless tag information to a server through high-speed wireless communication so that the server authenticates the validity of the wireless tag information and determines an access right of the mobile device after the authentication is successful and provides content service to the mobile device; and receive device signature information periodically generated by the wireless tag device and forward the received device signature information to the server via the high-speed wireless communication so that the server may determine the mobile device is still within the wireless communication area covered by the wireless tag device based on the device signature information and continuously provide content service to the mobile device.

17. The mobile device according to claim 16, wherein the processor is further configured to establish a high-speed wireless communication with the server according to the obtained connection configuration information.

18. An authentication system based on a wireless tag device, comprising a wireless tag device, a mobile device and a server, wherein the wireless tag device is disposed in a fixed position and configured for generating both wireless tag information and connection configuration information, and also periodically generating device signature information and transmitting the device signature information via the short-range wireless communication;

the mobile device is configured for obtaining the wireless tag information and the connection configuration information generated by the wireless tag device via a short-range wireless interface; establishing a high-speed wireless communication with a server according to the obtained connection configuration information, and forwarding the wireless tag information to the server through the high-speed wireless communication so that the server authenticates the validity of the wireless tag information and determines an access right of the mobile device after the authentication is successful and providing the content service to the mobile device; receiving the device signature information periodically generated by the wireless tag device and forwarding the received device signature information to the server via the high-speed wireless communication so that the server may determine the mobile device is still within the wireless communication area covered by the wireless tag device based on the device signature information and continuously provide content service to the mobile device;

the server is configured for receiving the wireless tag information forwarded by the mobile device, authenticating the validity of the wireless tag information, and determining an access right of the mobile device after the authentication is successful and providing the content service to the mobile device; receiving the device signature information forwarded from the mobile device and determining the mobile device is still within the wireless communication area covered by the wireless tag device based on the device signature information and continuously providing content service to the mobile device, and cancelling the access right of the mobile device if device signature information is not received for a predetermined interval.

19. The authentication system according to claim 18, wherein the server keeps off-line synchronization with the wireless tag device.

20. The authentication system according to claim 19, wherein the device signature information contains a message signature and time-varying information.

21. The authentication system according to claim 20, wherein the message signature is digest information generated by using a digest generation algorithm, and the time-varying information is generated by a random number generator or in a fixed increment manner.

22. The authentication system according to claim 18, wherein the short-range wireless communication is a connection based on RFID, Bluetooth, Infrared, or a new wireless network data communication technique-Zigbee.

23. The authentication system according to claim 18, wherein the high-speed wireless communication is based on a Wireless Fidelity WiFi, WIMAX, 3G, GPRS or CDMA.

24. The authentication system according to claim 18, wherein the server provides the mobile device with a content service after determining the mobile device is still within the wireless communication area covered by the wireless tag device.

25. The authentication system according to claim 18, wherein the server updates the access right of the mobile device according to the determination.

26. The authentication system according to claim 18, further comprising a content server for providing the mobile device with the content service, wherein the server transmits access authorization information to the mobile device after the authentication of the wireless tag information is successful, and the mobile device obtains the content service according to the access authorization information.

* * * * *